US008612953B2

(12) United States Patent
Das et al.

(10) Patent No.: US 8,612,953 B2
(45) Date of Patent: *Dec. 17, 2013

(54) COMPILER DRIVEN MECHANISM FOR REGISTRATION AND DEREGISTRATION OF MEMORY PAGES

(75) Inventors: Dibyendu Das, Karnataka (IN); Manish Gupta, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/613,746

(22) Filed: Sep. 13, 2012

(65) Prior Publication Data

US 2013/0007385 A1 Jan. 3, 2013

Related U.S. Application Data

(63) Continuation of application No. 12/111,991, filed on Apr. 30, 2008.

(51) Int. Cl.
*G06F 9/45* (2006.01)

(52) U.S. Cl.
USPC .......................................... 717/154; 710/56

(58) Field of Classification Search
None
See application file for complete search history.

(56) References Cited

U.S. PATENT DOCUMENTS

| 5,935,216 | A | * | 8/1999 | Benner et al. ................. 709/248 |
| 6,026,240 | A | | 2/2000 | Subramanian | |
| 6,715,145 | B1 | * | 3/2004 | Bowman-Amuah .......... 718/101 |
| 6,772,414 | B1 | | 8/2004 | Roediger et al. | |
| 7,086,044 | B2 | * | 8/2006 | Hanson et al. ................. 717/151 |
| 7,302,679 | B2 | * | 11/2007 | Chakrabarti et al. .......... 717/144 |
| 2006/0075057 | A1 | | 4/2006 | Gildea et al. | |
| 2006/0168092 | A1 | | 7/2006 | Makhervaks et al. | |
| 2007/0089105 | A1 | * | 4/2007 | Archambault et al. ....... 717/151 |

OTHER PUBLICATIONS

Liu, et al., High Performance RDMA-based MPI Implementation Over Infiniband, [ICS 02003].
Woodall, et al., High Performance RDMA Protocols in HPC [Euro-PVM-MPI Conf. 2006]; and.
Shipman, et al., Infiniband Scalability in Open MPI [IPDPS 2006].

* cited by examiner

*Primary Examiner* — Elias Mamo
(74) *Attorney, Agent, or Firm* — Garg Law Firm, PLLC; Rakesh Garg; Libby Z. Toub (57) ABSTRACT

A method, system and article of manufacture are disclosed for registering and deregistering memory pages in a computer system. The method comprises the steps of hoisting register and deregister calls in a given routine where temporal locality is present to overlap computation and communication; using software pipelined registration and deregistration where spatial locality is observed; and using intra-procedural and inter-procedural analysis by a compiler of the computer system to deregister dynamically allocated buffers. The preferred embodiment of the invention is based on an optimizing compiler. The compiler is used to extract information such as addresses of buffers which are being reused repeatedly (temporal locality), preferably in a loop. The compiler may also find information about spatial locality, such as arrays whose indexes are used in a well-defined manner in a series of messages, for example, array pages being accessed in a predefined pattern in a loop.

18 Claims, 5 Drawing Sheets

```
REGISTER(<in_buffer,...>, <in - buffer,...>)              // LABEL 1
REGISTER(<out_buffer,...>, <out_buffer ...>)              // LABEL 2 do stage = 1, ncells
   c = slice(1,stage)
   isize = ... jsize = ksize =
   if ( stage .eq. ncells ) then last = 1 else last = 0 endif
   if ( stage .eq. 1 ) then
    first = 1
    call lhsx(c)                           // lhs = ...
    call x_solve_cell (first, last, c)     // lhs = ... rhs = ...
   else
    first = 0
    call x_receive_solve_info(recv_id,c)   // calls mpi_irecv (out_buffer...)
    call lhsx( c )                         // lhs = ...

call mpi_wait ( send_id, ...)          // wait for the prev iterations' mpi_isend
    call mpi_wait ( recv_id, ...)          // wait for the mpi_irecv call x_unpack_solve_info (c)           // lhs = out_buffer, rhs = out_buffer
    call x_solve_cell ( first, last, c)    // lhs = ..., rhs = ...
   endif
 if ( last.eq. 0) call x_send_solve_info( send_id, c)   // in_buffer = ..., mpi_isend(in_buffer...)
enddo
//backsubstitute
do stage = ncells, 1, -1 c = slice(1,stage)
  first = 0
  last = 0
  if ( stage .eq. 1 ) first = 1
  if ( stage .eq. ncells ) I
    last = 1
    call x_backsubstitue(first,last,c)
  else call x_receive_backsub_info(recv_id,c)      //calls mpi_irecv(out_buffer,...)
    call mpi_wait(send_id, r_status, error)
    call mpi_wait(recv_id, r_status, error)
    call x_unpack_backsub_info(c)
    call x_backsubstitue(first, last, c)
   endif
   if (first .eq. 0 ) x_send_backsub_info(send_id,c)   // calls mpi_isen(in_buffer,...)
enddo DEREGISTER(<in_buffer, ...>, <in - buffer .... >)         // LABEL 7
DEREGISTER(<out_buffer,...>, <out_buffer                  // LABEL 8
```

```
do i = mm, 1, -1 if (...)
        jg(0,i,1) = ...
        jg(1,i,1) = ...
        jg(2,i,1) = ...
        jg(3,i,1) = ...
    endif mpi_allreduce(jg(0,i,1), jg_temp, ...)

...
end do
```

EACH REGISTRATION / DEREGISTRATION CAN BE OFFLOADED TO ANOTHER THREAD FOR OVERLAP

```
REGISTER(jg_temp)
REGISTER(jg(0,0,1))
REGISTER(jg(0,1,1))
...
REGISTER(jg(0,K,1)
do i = mm, 1, if (...)
        jg(0,i,1) = ...
        jg(1,i,1) = ...
        jg(2,i,1) = ...
        jg(3,i,1) = ...
    endif // PRE-REGISTER pages ahead of use, K is tunable based
    // on registering delay. We can pre-register more than one if
    // needed
    REGISTER(jg(0,i+K,1))

mpi_allreduce(jg(0,i,1), jg_temp, ...)

DEREGISTER(jg(0,i,1))   // we can suppress this if necessary
    endif
end do
DEREGISTER(jg_temp)
```

FIG. 6

```
foo( buf, ...)
{
    bar ( buf, ...)
    car ( buf, ...)
    ...
    // buf is used and freed, allocated
    // somewhere else
    for (...)
        ... = buf[..]

<cond1>DEREGISTER(<buf, ...>)
    <cond2>DEREGISTER(<buf, ...>)
    free(buf)
}
```

```
bar( buf, ...)
{
    if ( cond1 )
        mpi_recv(buf, ...)  // capture <buf,len,stride>
    ...
}
```

```
bar( buf, ...)
{
    if ( cond2 )
        mpi_send(buf, ...)  // capture <buf,len,stride>
    ...
}
```

FIG. 7

COMPILER DRIVEN MECHANISM FOR REGISTRATION AND DEREGISTRATION OF MEMORY PAGES

The present application is a continuation nonprovisional application claiming the priority of the filing date of the co-pending and commonly assigned U.S. patent application Ser. No. 12/111,991 entitled "A compiler driven mechanism for registration and deregistration of memory pages," filed on Apr. 30, 2008.

BACKGROUND OF THE INVENTION

1. Field of the Invention

This invention generally relates to memory management in computer systems, and more specifically, to methods and systems for registration and deregistration of memory pages. The preferred embodiment of the invention relates to such methods and systems for use in multi-node, distributed computer systems that employ remote direct memory access to transfer data between the nodes.

2. Background Art

An important factor in the performance of a computer or a network of computers is the ease or difficulty with which data is accessed when needed during processing. To this end, direct memory access (DMA) was developed early on, to avoid a central processing unit (CPU) of a computer from having to manage transfers of data between long-term memory such as magnetic or optical memory, and short-term memory such as dynamic random access memory (DRAM), static random access memory (SRAM) or cache of the computer. Accordingly, memory controllers such as DMA controllers, cache controllers, hard disk controllers and optical disc controllers were developed to manage the transfer of data between such memory units, to allow the CPU to spend more time processing the accessed data. Such memory controllers manage the movement of data between the aforementioned memory units, in a manner that is either independent from or semi-independent from the operation of the CPU, through commands and responses to commands that are exchanged between the CPU and the respective memory controller by way of one or more lower protocol layers of an operating system that operate in background and take up little resources (time, memory) of the CPU.

However, in the case of networked computers, access to data located on other computers, referred to as "nodes", has traditionally required management by an upper communication protocol layer running on the CPU of a node on the network. The lower layers of traditional asynchronous packet mode protocols, e.g., User Datagram Protocol (UDP) and Transport Control Protocol/Internet Protocol (TCP/IP), which run on a network adapter element of each node today, do not have sufficient capabilities to independently (without host side engagement in the movement of data) manage direct transfers of stored data between nodes of a network, referred to as "remote DMA" or "RDMA operations." In addition, characteristics with respect to the transport of packets through a network were considered too unreliable to permit RDMA operations in such types of networks. In most asynchronous networks, packets that are inserted into a network in one order of transmission are subject to being received in a different order than the order in which they are transmitted. This occurs chiefly because networks almost always provide multiple paths between nodes, and some paths involve a greater number of hops between intermediate nodes, e.g., bridges, routers, etc., than other paths and some paths may be more congested than others.

To support RDMA in pinning based networks (for example, Infiniband (see Infiniband Architecture Specification, Infiniband Trade Association, 2004)), Myrinet (see Myricom, Inc, "Myrinet", [http://www.myrinet.com])), pages that need to be transferred from the sender to the receiver must have the source/destination buffers pinned (registered) to physical memory for the duration of RDMA. Unpinning involves deregistering the memory at some later point of time, after the transfer has completed, mainly because of the fact that only a fraction of the actual physical memory can be pinned. But, pinning/unpinning (registration/deregistration) pages in memory is a costly operation, adding to the overhead of message passing interfaces like MPI (see MPI: A Message Passing Interface Standard, MPI forum). As used herein, the terms registration or pinning (and deregistration or unpinning) are used synonymously.

To address this overhead of pinning/unpinning and enable better computation-communication overlap in MPI-based code, various MPI implementations or layers underneath, which are entrusted with the task of registering or deregistering pages, may employ one of several solutions.

One approach is to restrict RDMA operations to a static memory region. This helps to register the memory region once and amortize this cost over a possibly large number of RDMA operations. But this approach restricts the application to a static memory region. For many applications, this is inappropriate and forces the user to copy to/from the registered memory. For larger messages, copy costs quickly become a bottleneck. However, this policy may still be applied to "eager" messages (See, High Performance RDMA-based MPI implementation over Infiniband, [ICS 2003], J. Liu, J. Wu, S. Kini, P. Wyckoff, et al.).

Another approach is to register memory on the fly. The source and destination buffers are registered before the RDMA operation and then deregistered upon completion of transfer. This approach unfortunately has a high cost of registering the memory prior to each RDMA operation. A third approach is to maintain some sort of a cache. In OpenMPI implementation this is called a Rcache (registration cache) (see Infiniband Scalability in Open MPI [IPDPS 2006], Galen M. Shipman, Tim S. Woodall, Rich L. Graham, Arthur B. Maccabe and Patrick G. Bridges). Once a new unregistered address is encountered and is entered in the cache, subsequent accesses can avoid the overhead of registration. For applications which regularly reuse target and destination buffers (exhibit temporal locality) for RDMA operations, the cost of the initial registration is effectively amortized over later RDMA operations. This approach was first available in MPICH-GM.

The first two solutions are not generic or effective enough. Regarding the cache-based solution, in many instances, even with a cache present, registration/deregistration overhead becomes unavoidable due to absence of temporal locality of the pages accessed in a message. For example, when adjacent pages of an array are accessed in a loop, this kind of situation may arise. OpenMPI has tried to overcome this problem (partially) for large messages by trying to pipeline the RDMA/registering process (see High Performance RDMA Protocols in HPC [Euro-PVM-MPI Conf. 2006], Tim S. Woodall, Galen M. Shipman, George Bosilca and Arthur B. Maccabe). It breaks up a large message into several units and registers future chunks that will be sent, as well as RDMAing the current chunks—all at the same time. But, shorter messages cannot be handled by this mechanism. Results reported (see High Performance RDMA Protocols in HPC [Euro-PVM-MPI Conf. 2006], Tim S. Woodall, Galen M. Shipman, George Bosilca and Arthur B. Maccabe), show that the pipelined strategy works well for message sizes of 100K bytes or more. Also, current registration/deregistration implementations are synchronous, resulting in more delay.

On the deregistration side, the cache-based strategy suffers from the usual cache eviction problem of when and what to deregister. In addition, for dynamically allocated pages, deregistration must happen before the pages are deallocated. This is difficult to do at run-time because a program can deallocate either non-registered or registered pages. The usual strategy is to rewrite allocation libraries like free( ) etc. for deregistration so that during a free operation, registration cache is checked to see whether the freed pages are present in the registration cache. This results in undue overhead and complications (see Infiniband Scalability in Open MPI [IPDPS 2006}, Galen M. Shipman, Tim S. Woodall, Rich L. Graham, Arthur B. Maccabe and Patrick G. Bridges). In Wyckoff, et al., work has been done to address the deregistration issue for arbitrary allocation/deallocation by providing for special register/deregister functions (dreg_register/ dreg_deregister) that call a kernel module dreg. The register/ deregister functions are available in user space and the dreg module in the kernel keeps track of VM (virtual memory) allocations and deallocations. By setting up a polling/signaling mechanism between the dreg module and the register/ deregister function, the registration cache can be maintained consistently.

The major drawback of all the current strategies used to reduce the overhead of pinning/unpinning is due to the implementation of the pinning/unpinning by layers like MPI or ones below it. These layers do not have a view of the locality of the message pages accessed as can be observed at the higher abstraction level of a program.

SUMMARY OF THE INVENTION

An object of this invention is to provide a computer-based strategy for registration/deregistration of memory pages in a computer system.

A further object of the present invention is to provide a mechanism for registration/deregistration of memory pages in a computer system based on analyzing message passing interface code at a high level.

Yet a further object of the invention is to register/deregister memory pages in a computer system in a way that overlaps computation with the overhead of pinning and that also avoids re-writing allocation libraries for deregistration.

These and other objectives are attained with a method, system and article of manufacture for registering and deregistering memory pages in a computer system. The system comprises the steps of hoisting register and deregister calls in a given routine where temporal locality is present to overlap computation and communication; using software pipelined registration and deregistration where spatial locality is observed; and using intra-procedural and inter-procedural analysis by a compiler of the computer system to deregister dynamically allocated buffers.

The preferred embodiment of the invention is based on an optimizing compiler. The compiler is used to extract information such as addresses of buffers which are being reused repeatedly (temporal locality), preferably in a loop. The compiler may also find information about spatial locality, such as arrays whose indexes are used in a well-defined manner in a series of messages, for example, array pages being accessed in a pre-defined pattern in a loop.

The preferred embodiment of the invention, described in detail below, effectively addresses a number of problems. For instance, this embodiment of the invention helps to find out at a program level which pages are to be registered and deregistered, well in advance of the actual usage. This has several advantages. First, registration/deregistration can now happen in an "asynchronous" thread, helping in the overlap of computation and communication totally. Second, this helps in measuring the amount of pages that need to be registered/ deregistered using compiler-based profiling mechanisms (which can be done easily when compared to library instrumentation). Such profiling can help in fine-tuning the placement of registration/deregistration calls.

Also with the preferred embodiment of the present invention, deregistration for dynamically allocated pages becomes easier to handle. There is no need to change and trap free/ delete calls to find out whether certain pages need to be deregistered before they are freed. Also, kernel changes are not required. Even programs that do not demonstrate temporal locality of accessed pages can be effectively registered/ deregistered using a compiler-based approach, which is similar to software prefetching. This is not possible using any of the current methods adopted.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIG. 4 shows the example of FIG. 3 after coalescing the Register/Deregister calls.

DETAILED DESCRIPTION OF THE PREFERRED EMBODIMENTS

Figure 1:
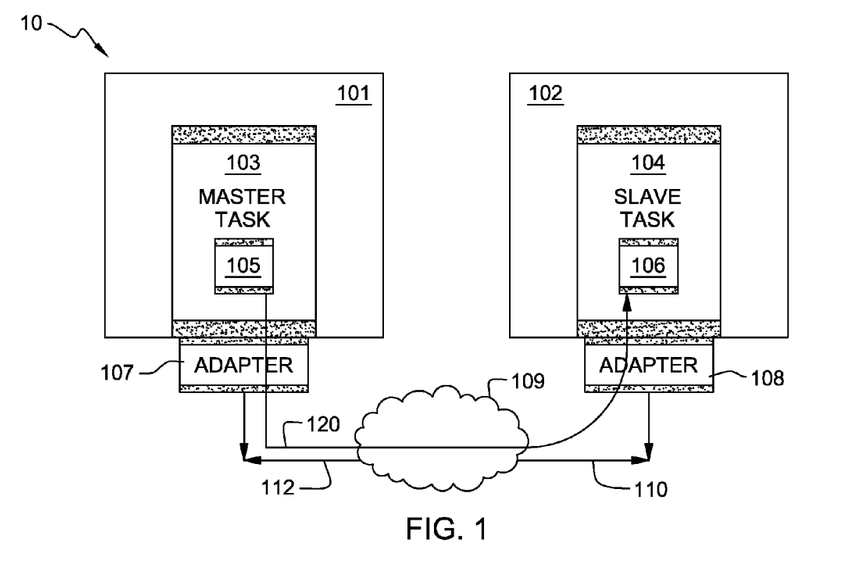
FIG. 1 illustrates a system and operation of remote direct memory access (RDMA) in a computer system.

FIG. 1 is a diagram illustrating principles of remote direct memory access (RDMA). Nodes 101 and 102 are computers of a multi-processor system having a plurality of nodes connected by a network 10, as interconnected by network adapters 107, 108, a switching network 109, and links 110 and 112 between network adapters 107, 108 and the switching network 109. Within switching network 109 there are typically one or more local area networks and/or one or more wide area networks, such network(s) having a plurality of links that are interconnected by communications routing devices, e.g., switches, routers, and bridges. As such, the switching network 109 typically provides several alternative paths for communication between the network adapter 107 at node 101 and network adapter 108 at node 102.

The network 10 including nodes 101, 102 and switching network 109 need not have a reliable connection or reliable datagram transport mechanism. Rather, in the embodiments of the invention described herein, RDMA can be performed in a network having an unreliable connection or unreliable datagram transport mechanism, i.e., one in which packets of a communication between nodes, e.g., a message, are received out of the order in which they are transmitted. When the switching network 109 includes a plurality of paths for communication between nodes 101 and 102, and the packets of that communication are transmitted over different paths, it is likely that the packets will be received out of transmission order at least some of the time.

The nodes 101, 102 each include a processor (not shown) and memory (not shown), both of which are utilized for execution of processes, which may also be referred to as "tasks". As further shown in FIG. 1, one or more tasks (processes) 103 and 104 are executing on nodes 101 and 102, respectively. Typically, many tasks execute concurrently on each node. For simplicity, the following description will refer only to one task per node. Task 103 has access to the memory of the node 101 on which it runs, in terms of an address space 105 assigned to the task. Similarly, task 104 has access to the memory of node 102 on which it runs, in terms of an address space 106 assigned to that task.

Using RDMA, represented at 120, task 103 running on node 101, is able to read from and write to the address space 106 of task 104, in a manner similar to reading from and writing to its own address space 105. Similarly, utilizing RDMA, task 104 running on node 102 is able to read from and write to the address space 105 of task 103, also in a manner similar to reading from and writing to its own address space 106. For RDMA enabled processing, each of the tasks 103 and 104 is a cooperating process, such that for each task, e.g., task 103, at least some portion of its address space, e.g. address space 105, is accessible by another cooperating process. FIG. 1 illustrates a two-task example. However, the number of cooperating processes is not limited for RDMA operations. Thus, the number of cooperating processes can be any number from two processes to very many.

In FIG. 1, master task 103 on node 101 is shown initiating an RDMA write operation to read data from the address space 106 of task 104 on node 102 into its own address space labeled 105. The RDMA transport protocol enables this data transfer to occur without the active engagement of the slave task, i.e. without requiring the an upper protocol layer operating on node 102 to be actively engaged to support the RDMA data transfer to slave task 104.

Figure 2:
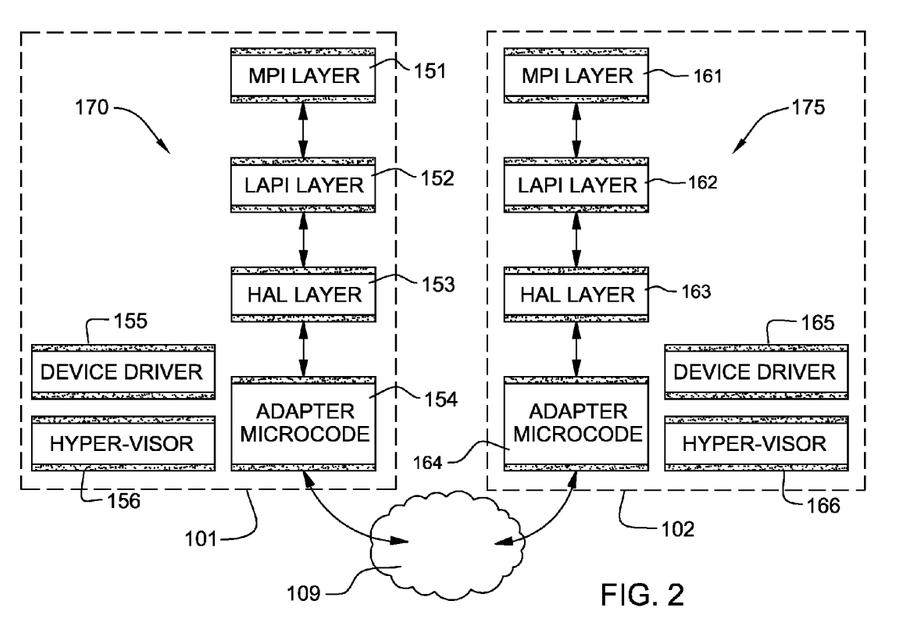
FIG. 2 shows a communication protocol stack used to implement RDMA.

FIG. 2 shows illustrative communication protocol and node software stacks 170, 175 in which RDMA is implemented according to an embodiment of the invention. Stack 170 runs on node 101, and stack 175 runs on node 102. Many other types of protocol stacks are possible. FIG. 2 illustrates only one of many environments in which RDMA can be implemented according to embodiments of the invention. In FIG. 2, message passing interface (MPI) layers 151, 161 are upper protocol layers that run on respective nodes that enforce MPI semantics for managing the interface between a task executing on one of the respective nodes and the lower protocol layers of the stack. Collective communication operations are broken down by MPI into point-to-point lower layer application programming interface (LAPI) calls. The MPI translates data type layout definitions received from an operating task into appropriate constructs that are understood by the lower layers LAPI and the HAL layer. Typically, the MPI layer manages message-matching rules.

The LAPI layer, e.g., layer 152 of protocol stack 170, and layer 162 of protocol stack 175, provides a reliable transport layer for point-to-point communications. LAPI maintains state for messages and packets in transit between the respective node and another node of the network 10, and re-drives any packets and messages when the receiving node does not acknowledge them within an expected time interval. In operation, the LAPI layer packetizes non-RDMA messages into an output staging buffer of the node, such buffer being, illustratively, a send first-in-first-out (herein SFIFO) buffer maintained by the HAL (hardware abstraction layer) 153 of the protocol stack 170. Typically, HAL 153 maintains one SFIFO and one receive FIFO (herein RFIFO) (an input staging buffer for receiving incoming packets) for each task that runs on the node. Non-RDMA packets arriving at the receiving node from another node are first put into a RFIFO. Thereafter, the data from the buffered packets are moved into a target user buffer, e.g. address space 105, used by a task, e.g. task 103, running on that node.

On the other hand, for RDMA messages, the LAPI layer uses HAL 153 and a device driver 155, to set up message buffers for incoming and outgoing RDMA messages, by pinning the pages of the message buffers and translating the messages. The state for re-driving messages is maintained in the LAPI layer, unlike other RDMA capable networks such as the above-described reliable connection or reliable datagram networks in which such state is maintained in the HAL, adapter, or switch layer. Maintenance of state by the LAPI layer, rather than a lower layer of the stack 170 such as HAL or the adapter layer (FIG. 2) enables RDMA to be conducted reliably over an unreliable datagram service.

The HAL layer, e.g., layer 153 of protocol stack 170 on node 101, and layer 163 of stack 175 on another node 102, is the layer that provides hardware abstraction to an upper layer protocol (ULP), such ULP including one or more of the protocol layers LAPI and MPI, for example. The HAL layer is stateless with respect to the ULP. The only state HAL maintains is that which is necessary for the ULP to interface with the network adapter on the particular node. The HAL layer is used to exchange RDMA control messages between the ULP and the adapter microcode. The control messages include commands to initiate transfers, to signal the completion of operations and to cancel RDMA operations that are in-progress.

The adapter microcode 154, operating on a network adapter 107 of a node 101 (FIG. 1), is used to interface with the HAL layer 153 for RDMA commands, and to exchange information regarding completed operations, as well as cancelled operations. In addition, the adapter microcode 154 is responsible to fragment and reassemble RDMA messages, to copy data out of one user buffer 103 for a task running on the node 101, to adapter memory for transport to network, and to move incoming data received from the network into a user buffer for the receiving task.

As mentioned above, to support RDMA in pinning based networks, memory pages that need to be transferred from the sender to the receiver must have the source/destination buffers pinned (registered) to physical memory for the duration of RDMA. Unpinning involves deregistering the memory at some later point of time, after the transfer has completed, mainly because of the fact that only a fraction of the actual physical memory can be pinned. But, pinning/unpinning (registration/deregistration) pages in memory is a costly operation adding to the overhead of message passing interfaces.

The present invention effectively addresses this overhead. Generally, by analyzing message-passing interface based code at a high level, the present invention not only does a better job of registering pages early (and thus completely overlaps computation with the overhead of pinning), but also avoids re-writing of allocation libraries for deregistration. This is done with the help of the knowledge of which pages are being deallocated and whether they have been registered earlier.

The preferred embodiment of the invention is based on an optimizing compiler. The compiler is used to extract information like addresses of buffers which are being reused repeatedly (temporal locality), preferably in a loop. It may also find information about spatial locality, like arrays whose indexes are used in a well-defined manner in a series of messages, for example, array pages being accessed in a predefined pattern in a loop. The invention can be categorized into three sub-areas: a) Hoisting/Sinking of register/deregister calls where temporal locality is present to overlap computation and communication; b) Using prefetching techniques for registration/deregistration where spatial locality is observed, once again for computation communication overlap; and c) Using intra/inter-procedural compiler analyses to effectively deregister dynamically allocated buffers. Each of these sub-areas is discussed in detail below.

Compiler-Based Registration/Deregistration to Exploit Temporal Locality

The case of temporal locality, or the same buffer address being used a number of times in a loop, is a prime target for registration hoisting. We can carry out the registration of such addresses only once outside the loop and deregister the addresses (if required) once the loop exits. To support this, a user-level mechanism is provided for registration or deregistration of pages that is visible to a tool like the compiler. These compiler-visible functions are referred to herein as REGISTER and DEREGISTER, respectively. Currently, strict structures are not imposed on these functions. The only requirement is that these functions accept a variable argument list of memory pages that can be registered/deregistered. Many vendors who support message-passing interfaces will be able to supply these two functions without much difficulty.

The advantages of the preferred compiler-based registration/deregistration mechanism are several. First, if the REGISTER/DEREGISTER functions are invoked asynchronously, then the registration/deregistration overhead can be easily overlapped with other computation. This is not possible with any runtime mechanism, as some amount of startup overhead is always realized on first-time registration (even if messages used pipelined registration technique). Second, the preferred embodiments can register/deregister memory pages that do not exhibit temporal locality but exhibit spatial locality using a form similar to software pipelining. Third, deregistration for allocated buffers become easier, as noted earlier.

Figure 3:
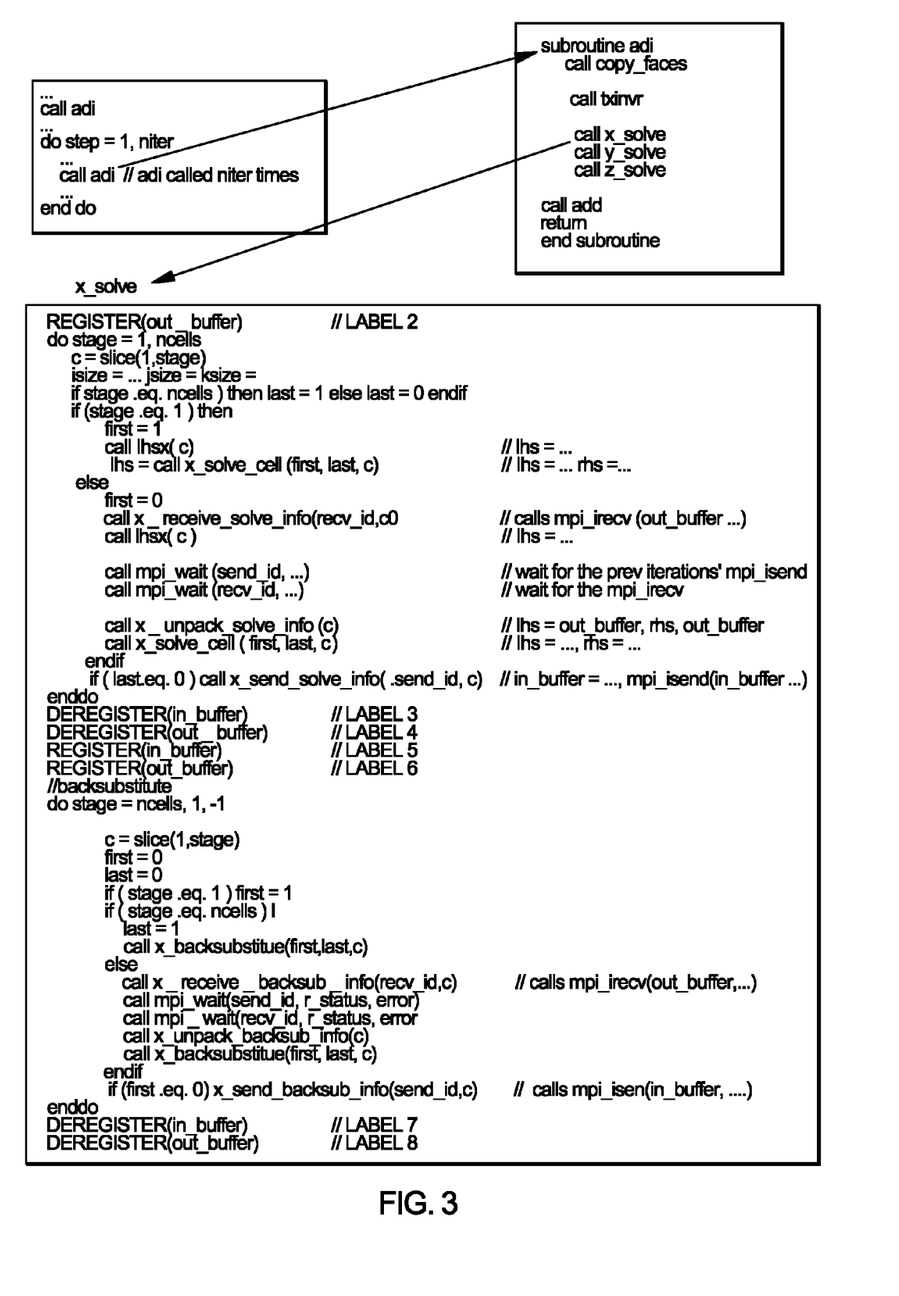
FIG. 3 shows an example of compiler-based registration/ deregistration to exploit temporal locality.

The following example, discussed with reference to FIG. 3, is from BT, which is a benchmark in the NAS Parallel Benchmark Suite (NPB). The file involved is x_solve.f. Similar code can be found in y_solve.f and z_solve.f.

In the subroutine x_solve, mpi_irecv/isends are invoked via calls to the routines x_send(receive)_solve_info and x_send(receive)_backsub_info. In each of these cases, either a in_buffer/out_buffer is used, and the same address continues to be used in the entire do loop, both for the first do loop as well as the second loop. Hence, the registration/deregistration of these buffers can be hoisted out of the respective do loops. This is denoted by the REGISTER/DEREGISTER functions which may be special user-level calls that can be invoked by the compiler and inserted at places of interest. Here, the places or labels of interest are denoted by numbers, 1 to 8 (in FIG. 3). However, it can be observed that the DEREGISTER functions at labels 3 and 4 can be moved before 7 and 8 because delayed deregistration is better, while the REGISTER functions at labels 5 and 6 can be moved after the labels 1 and 2, as early registration works better for computation-communication overlap. This will allow the four REGISTER functions at the top to be merged to two based on the in_buffer and out_buffer.

Similarly, the DEREGISTER functions at the end can be merged to create two functions—one for the in_buffer and the other for the out_buffer (Label 1 and Label 2 in FIG. 4). The approximate signature of a REGISTER/DEREGISTER function accepts a series of in_buffer addresses as input for registration/deregistration. However, this is not mandatory. In such a case, the eight calls can remain as separate standalone calls at the top (four of them) and at the bottom (four of them) for the x_solve subroutine.

Figure 5:
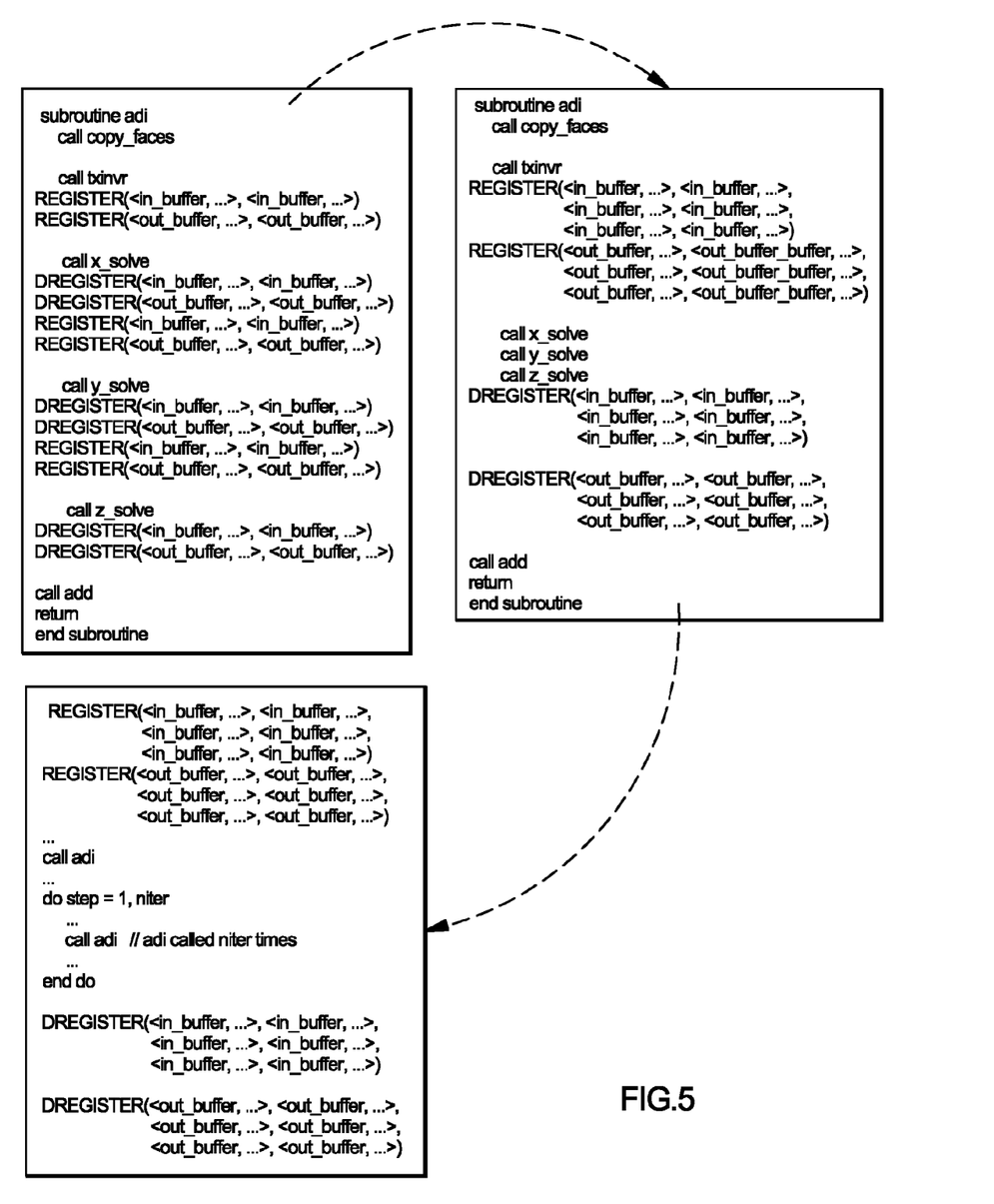
FIG. 5 illustrates a subroutine in which the Register calls have been moved to the start of the subroutine, and Deregister calls have been moved to the end of the subroutine.

FIG. 4 shows how x_solve looks after coalescing the REGISTER/DEREGISTER calls:

The register/deregister functions can be hoisted higher, if possible. Since x_solve, y_solve and z_solve all exhibit similar characteristics, each of them creates two REGISTER and two DEREGISTER calls each by applying the same logic as above (see FIG. 5). These calls have been hoisted out of the respective x_solve/y_solve and z_solve into the subroutine adi, which invoke them as shown in FIG. 5. After merging, all the REGISTER/DEREGISTER calls can be moved to the start/end of the subroutine adi as shown. The subroutine adi is invoked in a loop in the main program and the calls can be hoisted outside of this loop too.

It can be seen that by hoisting/sinking the registration/deregistration, enough window is created for subsequent overlap of these calls by invoking these calls in a synchronous manner. The only issue that can arise with aggressive hoisting/sinking is the creation of extra pinning pressure due to a limit on the number of pages that can be pinned simultaneously. This can be taken care of in the compiler using a profile-driven approach, whereby profiles of how many pages get registered/deregistered can be tracked for each call. Hoisting/sinking can be controlled based on this profile.

This algorithm (and the subsequent ones discussed below) assumes the existence of a standard optimizing compiler (like IBM's XL) which has the infrastructure for some of the analyses employed here. The algorithm also assumes that (as noted earlier) two user-level functions called REGISTER( . . . ) and DEREGISTER( . . . ) are made available, for example, by vendors implementing message-passing interfaces for pinning-based networks.

Intra-Procedural Registration Hoisting Phase

In this phase, the following steps are preferably preformed.
1. In every single routine/function collect all mpi_ . . . calls in loops that need message transfer. Extract the name of the buffer to be used, the starting address and the length of transfer. Consider this to be a triple of the form <buffer, start_address,len>.
2. Check whether the triple <buffer, start_address, len> is invariant over the loop. If so, hoist the registration and sink the deregistration by calling a REGISTER(<buffer,start_address,len>) and a DEREGISTER(<buffer_start,address, len>) before and after the invocation of the loop, respectively.
3. Carry out this procedure of hoisting/sinking until all nested loops are handled. It can happen that in a doubly nested loop, a triple is invariant over the innermost loop but not at the outermost loop. In such a case, leave the register/deregister function calls embedded in the outermost loop.
4. For all REGISTER/DEREGISTER functions that appear at the outermost level of a routine, move the invocations to the start/end of the routine. Also, mark these REGISTER/

DEREGISTER functions as "exposed". Capture all such exposed functions for all the routines (if available).

Inter-Procedural Registration Hoisting Phase

The following steps are preferably performed in this phase.
1. Traverse the procedure call graph bottom-up, and for every "exposed" triple apply the steps 2, 3 (of the intra-procedural phase) at the call-sites. Apply step 4 (of the intra-procedural phase) after all the callees of a function have been resolved in this manner.
2. All the final positions of the REGISTER/DEREGISTER functions would be known after the entire call graph has been traversed in a bottom up fashion.

Software-Pipelined-Registration/Deregistration

This technique (software-pipelined-registration) is derived from software prefetching carried out in the compilers so that data that will be accessed in the future can arrive ahead of use. Software prefetching can have an arbitrary spatial window as opposed to hardware-centric techniques and perform well for regular spatial accesses like arrays. Software based prefetching using helper threads for dynamic code has also been carried out with good results.

Figure 6:
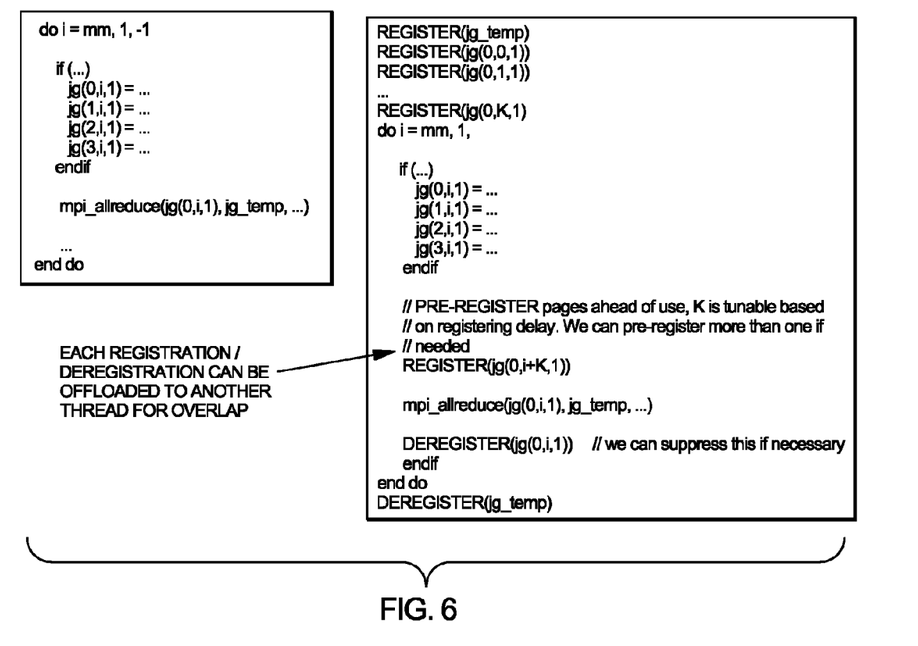
FIG. 6 generally illustrates software-pipelined registration/deregistration.

Consider a case in MG/mg.f from the NAS Parallel Benchmark Suite (FIG. 6). The code snippet involves a call to mpi_allreduce. In this case, the buffer is not constant because jg(0,i,1) is used in each call to mpi_allreduce. For such cases, we can derive what buffer addresses will be used in future iterations and these buffers can be registered early (using a different thread preferably). The current techniques (employed by various MPI implementations) of caching registered pages will not be able to exploit such cases, as the same address is not used in successive iterations. Even pipelining techniques proposed in OpenMPI for registering pages for large messages will not be able to utilize the regular page access patterns, as noted here in FIG. 6.

The central idea of software-pipelined-registration is to register ahead a page (or a set of pages) of the buffer to be used in a future iteration (or a set of iterations). This can help in overlapping computation of a current iteration with the communication overhead of a future iteration if the registration/deregistration can be carried out asynchronously.

Algorithm for Software-Pipelined-Registration

The preferred embodiment of this algorithm performs the following steps.
1. Find loops with message passing calls where the buffers used are not invariant but yet demonstrate spatial locality i.e. we can predict which buffers address(es) will be used in a future iteration or a set of future iterations.
2. Find the size of buffer accessed in every iteration. Let it be termed L. Also, we can calculate the number of pages that need to be registered/deregistered at either compile time/run time (by code insertion) for each iteration. Let P be the number of such pages. It is also possible that multiple iterations access the same page. If that is the case, let Ni be the number of iterations that access a single page needed for registration/deregistration. Hence $Ni \geq 1$.
3. The term registration distance (Rd) is defined as the number of iterations we should look ahead for registering. It is easy to see that $Rd \geq Ni \geq 1$. Let, Rd be such that the time taken to register a page is equal to/less than the time taken to execute Nj iterations but exceeds the time taken to execute Nj−1 iterations. So, $Rd \geq Nj$. Hence the Rd chosen should be $Rd=\max(Ni,Nj)$. Note that this may need to be calculated at run-time using code insertion techniques (before the loop is entered).
4. Insert a REGISTER(buff[itr+Rd], . . . ) in every iteration from the first_itr to (last_itr−Rd). Insert a DEREGISTER (buff[itr], . . . ) for every iteration.
5. Insert a bunch of REGISTER(buff[0], . . . ), . . . , REGISTER(buff[Rd−1], . . . ) ahead of the loop to register the initial pages.

Dynamically allocated pages pose a difficult problem for deregistration. In accordance with the preferred embodiment of the invention, the compiler is used to track allocated pages that need to be de-registered. Before they are deallocated, de-registration function is called that cleans up the registration cache or anything similar, in an appropriate manner. This also avoids changing any kind of library routines to trap for de-registration as suggested above or use any modification in the kernel.

Figure 7:
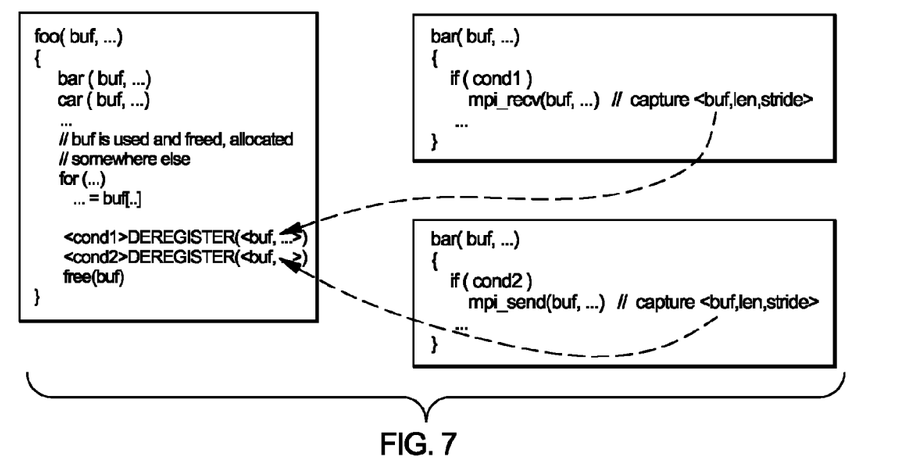
FIG. 7 shows a case where a buffer is used and subsequently deallocated.

Consider a simple case where a buffer is used and subsequently deallocated (see FIG. 7). In this case, before the deallocation is activated via the free call, we can actually deregister the relevant pages using a list of start addresses and lengths respectively. This information, of which parts of the buffer have been registered (earlier), can be captured in triplets of the form noted above by the compiler using inter/intra-procedural analyses. If they had been executed under conditional code, that information can also be carried. This information is passed inter-procedurally, in this case from bar( ) and car( ) to foo( ) and is used before the relevant free( ) call for de-registration. For non-trivial cases, we will also need the alias points-to set of the buf to find out its aliases and capture all the registration triples correctly.

Algorithm for Deregistration for Dynamically Allocated Buffers

This algorithm preferably performs the following steps.
1. This algorithm will require advanced interprocedural points-to analysis to carry out alias analysis. Also we assume that all message buffers that need to be registered/deregistered have been collected as in Step 1 of the Intra-Procedural Registration Hoisting Algorithm in Sec 3.1.
2. For every call to free( ) or its equivalent, find out the buffer B that is being freed. Find out all the aliases of this buffer using points-to analysis. Let Bset be the set consisting of B and all its aliases.
3. Find out all the memory registration/deregistration calls that can reach this free( ) call using a search of the call graph. Let the set of B and all buffers that can be its alias, are registered and can reach the free( ) call be called the MRDSet.
4. Insert a runtime check before free( ) to find whether there is any overlap between the Bset and the MRDset. The "if" arm of the condition, deregisters the overlapping addresses, while the "else" arm does not do anything.

The preferred embodiment of the invention provides a number of important advantages. For example, a compiler-based registration/deregistration strategy may allow greater flexibility in overlapping computation and communication as the registration overhead incurred, as part of communication in RDMA-based networks can be effectively overlapped. This is possible if registration can be hoisted or issued early in an asynchronous manner. Techniques like software prefetching can be employed for early registration in cases where the accesses demonstrate spatial locality instead of temporal locality. Complexities involved in tracking memory related calls for deregistration may also be avoided by following a compiler-based procedure that deregisters the relevant pages by utilizing intra and inter-procedural knowledge.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of registering and deregistering memory pages in a computer system, comprising the steps of:
    hoisting register and deregister calls in a given routine where temporal locality is present to overlap computation and communication;
    using software pipelined registration and deregistration where spatial locality is observed; and
    using intra-procedural and inter-procedural analysis by a compiler of the computer system to deregister dynamically allocated buffers, wherein using the intra-procedural and inter-procedural analysis comprises:
    forming a triple comprised of said buffer name, starting address and length, and wherein said triple is found in one of the loops; and
    determining whether said triple is invariant over said one of said loops.

2. The method according to claim 1, wherein the locating step includes the steps of: identifying buffer addresses being used plural times in a loop in said given routine; and registering the buffer addresses outside said loop.

3. The method according to claim 2, wherein the registering step includes the step of registering each buffer addresses only once.

4. The method according to claim 3, wherein the locating step includes the further step of deregistering the buffer addresses once the loop exits.

5. The method according to claim 1, wherein the step of using intra-procedural and inter-procedural analysis includes the further steps of:
    extracting from one of the calls a Registration triple and a Deregistration triple;
    hoisting the registration triple to before invocation of the loop, and dropping the Deregistration triple to after the invocation of the loop.

6. The method according to claim 1, wherein the step of using software pipelined registration and deregistration includes the step of registering ahead a page of the buffer to be used in a future iteration.

7. The method according to claim 6, wherein the step of using software pipelined registration and deregistration includes the step of finding loops with message passing calls where the buffers used demonstrate spatial locality for a future iteration.

8. The method according to claim 7, wherein the step of using software pipelined registration and deregistration includes the steps of:
    for each of the buffers, finding the sizes of the buffer accessed in every iteration; and
    for each iteration, calculating the number of pages that need to be registered and deregistered at either compile time or run time.

9. A memory management system for registering and deregistering memory pages in a computer system, the memory management system comprising at least one processing unit configured for:
    hoisting register and deregister calls in a given routine where temporal locality is present to overlap computation and communication;
    using software pipelined registration and deregistration where spatial locality is observed; and
    using intra-procedural and inter-procedural analysis by a compiler of the computer system to deregister dynamically allocated buffers, wherein using the intra-procedural and inter-procedural analysis comprises:
    forming a triple comprised of said buffer name, starting address and length, and wherein said triple is found in one of the loops; and
    determining whether said triple is invariant over said one of said loops.

10. The memory management system according to claim 9, wherein the at least one processor unit is configured for performing the locating by:
    identifying buffer addresses being used plural times in a loop in said given routine; and
registering the buffer addresses outside said loop.

11. The memory management system according to claim 10, wherein the at least one processor unit is configured for performing the registering by registering each buffer addresses only once.

12. The memory management system according to claim 9, wherein the at least one processor unit is configured for using software pipelined registration and deregistration by finding loops with message passing calls where the buffers used demonstrate spatial locality for a future iteration.

13. An article of manufacture comprising
    at least one computer usable device having computer readable program code logic to execute a machine instruction in a processing unit for registering and deregistering memory pages in a computer system, said computer readable program code logic, when executing, performing the following steps:
    hoisting register and sinking deregister calls in a given routine where temporal locality is present to overlap computation and communication;
    using software pipelined registration and deregistration where spatial locality is observed; and
    using intra-procedural and inter-procedural analysis by a compiler of the computer system to deregister dynamically allocated buffers, wherein using the intra-procedural and inter-procedural analysis comprises:

forming a triple comprised of said buffer name, starting address and length, and wherein said triple is found in one of the loops; and determining whether said triple is invariant over said one of said loops.

14. The article of manufacture according to claim 13, wherein the locating step includes the steps of:

identifying buffer addresses being used plural times in a loop in said given routine; and registering the buffer addresses outside said loop.

15. The article of manufacture according to claim 14, wherein the locating step includes the further step of deregistering the buffer addresses once the loop exits.

16. The article of manufacture according to claim 13, wherein the step of using intra-procedural and inter-procedural analysis includes the steps of:

collecting calls in loops that need message transfer; for each of the collected calls, extracting a name of a buffer to be used by the call, a starting address of the buffer, and a length of data to be transferred into the buffer;

extracting from one of the calls a Registration triple and a Deregistration triple; hoisting the Registration triple to before invocation of the loop; and dropping the Deregistration triple to after the invocation of the loop.

17. A method of registering and deregistering memory pages in a computer system, comprising the steps of:

hoisting register and deregister calls in a given routine where temporal locality is present to overlap computation and communication;

using software pipelined registration and deregistration where spatial locality is observed; and using intra-procedural and inter-procedural analysis by a compiler of the computer system to deregister dynamically allocated buffers, wherein using the intra-procedural and inter-procedural analysis further comprises:

extracting from one of the calls a Registration triple and a Deregistration triple;

hoisting the registration triple to before invocation of the loop, and dropping the Deregistration triple to after the invocation of the loop.

18. A memory management system for registering and deregistering memory pages in a computer system, the memory management system comprising at least one processing unit configured for:

hoisting register and deregister calls in a given routine where temporal locality is present to overlap computation and communication;

using software pipelined registration and deregistration where spatial locality is observed by finding loops with message passing calls where the buffers used demonstrate spatial locality for a future iteration; and using intra-procedural and inter-procedural analysis by a compiler of the computer system to deregister dynamically allocated buffers.

\* \* \* \* \*